United States Patent
Gudelis et al.

[15] 3,644,195
[45] Feb. 22, 1972

[54] SOLVENT DEWAXING-DEOILING PROCESS

[72] Inventors: David A. Gudelis; John F. Eagen, both of Sarnia, Ontario, Canada

[73] Assignee: Esso Research and Engineering Company

[22] Filed: Dec. 1, 1969

[21] Appl. No.: 881,025

[52] U.S. Cl. ..................................208/33, 208/31, 208/37
[51] Int. Cl. ............................................................C10g 43/08
[58] Field of Search ........................................208/33, 37, 31

[56] References Cited

UNITED STATES PATENTS

| | | | |
|---|---|---|---|
| 2,612,465 | 9/1952 | Kiersted et al. | 208/33 |
| 2,915,450 | 12/1959 | Olson | 208/31 |
| 3,105,809 | 10/1963 | Butler et al. | 208/31 |
| 3,509,039 | 4/1970 | Helion et al. | 208/31 |

OTHER PUBLICATIONS

C10g 43/08

Primary Examiner—Herbert Levine
Attorney—Pearlman and Stahl and C. D. Stores

[57] ABSTRACT

Wax-containing oil is chilled in a multistage tower by the introduction of cold solvent to each stage under intense agitation so that substantially instantaneous mixing and cooling occurs in each stage. The wax is separated from the oil and is again mixed with solvent at a temperature sufficient to dissolve the low-melting wax only from which the high-melting wax is then separated.

16 Claims, 1 Drawing Figure

COMBINED DEWAXING DEOILING PROCESS

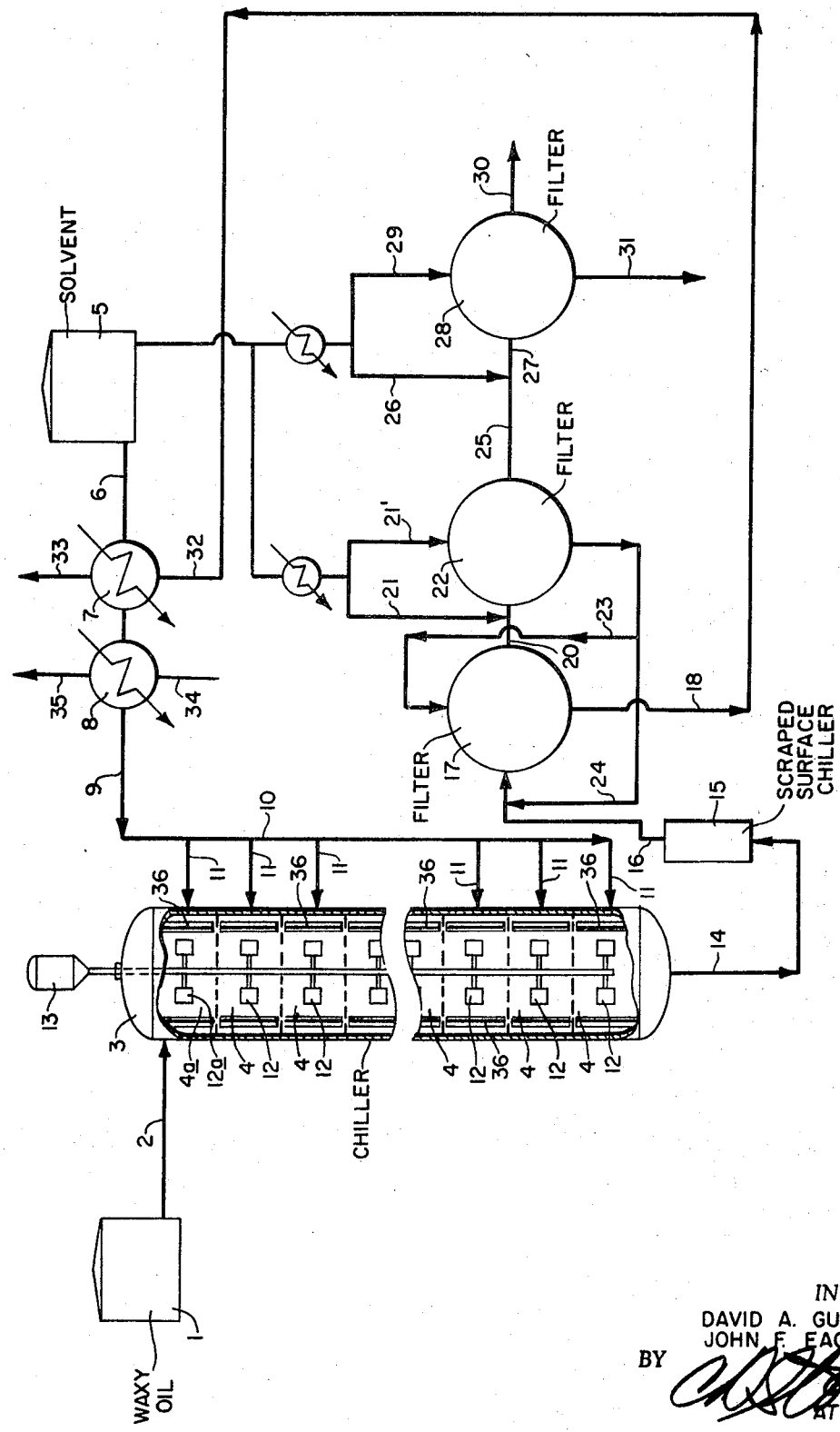

SOLVENT DEWAXING-DEOILING PROCESS

BACKGROUND OF THE INVENTION

This invention relates to improvements in dewaxing oils in which the oil is dewaxed in the presence of a nonvolatile solvent such as a mixture of methyl ethyl ketone and methyl isobutyl ketone and the like.

It is known in the prior art to dewax petroleum oil stocks by cooling an oil/solvent solution in scraped surface exchangers. In this type process, the oil and selective solvent are admixed at a temperature sufficient to effect complete solution of the oil and its contained wax in the solvent. The extent of dilution is dependent upon the particular oil and the particular solvent employed and is adjusted to facilitate easy handling and optimum filtration rates. The solution is cooled at a uniformly slow cooling rate; e.g., 1°–5° F./min., under conditions which are controlled so as to avoid any substantial agitation of the solution during precipitation of the wax. Notwithstanding the carefully controlled conditions used in this type of commercial operation, there are several deficiencies which hamper commercial operation. Most significant among these deficiencies is the loss of good heat transfer due to wax deposition on the exchanger surfaces. Such fouling has been repeatedly noted after short periods of operation; e.g., 12–48 hours. Associated directly with the loss of good heat transfer is the loss of careful control over the cooling rate and a corresponding loss of uniform crystal growth. This nonuniform crystal growth then results in lower filtration rates. The high-pressure drop through the chilling section also reduces the maximum feed rate attainable and requires frequent depressuring and double trains of exchangers. Physical mashing of the wax crystals by the action of the scrapers may also contribute to poor filtration.

It is also known in the prior art to dewax petroleum oil stocks by cooling in scraped surface exchangers using an incremental solvent addition technique.

In this technique the solvent is added at several points along the chilling apparatus. The waxy oil is chilled without solvent until some wax crystallization has occurred and the mixture has thickened considerably. The first increment of solvent is introduced at this point and the cooling continues. Each increment of solvent is added as necessary to maintain fluidity, until the desired separation temperature is reached, at which point the remainder of the solvent desired for filtration is added. In this technique, which is in common industrial use, it is well known and has been repeatedly demonstrated that the temperature of each increment of solvent should be the same as that of the main stream at its point of addition. Having the solvent at a lower temperature causes shock chilling of the slurry at that point, with resulting formation of crystal fines and impairment of filter rate; having the solvent warmer throws an unnecessary additional load on the scraped surface chillers. It should be clearly understood that all the chilling of the slurry in this well known process is accomplished through the walls of the scraped surface chillers, rather than by means of cold solvents. This process requires somewhat less of the costly scraped surface heat exchange than the first one cited, because less of the solvent chilling is done in scraped surface. In this process the dewaxed oil yield is normally higher but the filter rates are normally lower. Otherwise, it suffers from the same disadvantages previously cited.

In the processes above described the wax first obtained is known as slack wax. This slack wax contains oil which must be removed. In the usual practice as represented by U.S. Pat No. 2,915,450 to Olson, the slack wax is mixed with solvent, heated above the cloud point for complete solution and then chilled down again in scraped surface equipment to a temperature which gives the desired wax product. In other words the process is very similar to dewaxing as previously described and suffers from similar disadvantages previously cited.

In copending application Ser. No. 666,268 filed Sept. 8, 1967, for Donald B. Hislop, now abandoned there is proposed a method of dewaxing oils in which the oil is shock chilled by contacting it with a cold solvent at a plurality of points along a vertical tower while maintaining a zone of intense agitation at each point of solvent injection such that substantially instantaneous mixing occurs at each point, i.e., within a second or less.

In the process described in the above application all the chilling of the slurry is accomplished by the cold solvent, and no scraped surface, indirect chilling is involved. The intense agitation more than overcomes the well known harmful effects of shock chilling and results in the formation of a wax slurry having a unique crystal structure with markedly superior filtering characteristics -- a relatively high-filter rate and good dewaxed oil yield. It is disclosed in Ser. No. 666,268 that the intense agitation is provided by mechanical mixers, driven by a variable speed mechanism.

SUMMARY OF THE DISCLOSURE

According to the present invention, it has been found that the unique crystal structure obtained by the process of Ser. No. 666,268 enables an improvement in the deoiling of slack wax by mixing the slack wax with more solvent and then heating it only to a temperature required to dissolve the low melting wax only, e.g., 40°–80° F. It is not necessary to heat the mixture above the cloud point as described in U.S. Pat No. 2,915,450. The resulting wax-solvent mixture is then filtered whereby a high-grade wax containing substantially no oil is obtained. When this technique is applied to convention scraped surface dewaxing operations, wax of unsatisfactory product quality is obtained. Plant operation using conventional chilling followed by deoiling has demonstrated that the oil content of the refined wax could be reduced to the desired level but the separation between the low-melting and the high-melting waxes was not achieved. The product was soft and did not meet the refined wax quality requirements.

BRIEF DESCRIPTION OF THE DRAWING

The drawing is a diagrammatic representation of one embodiment of this invention.

DETAILED DESCRIPTION

Referring now to the drawing, the oil stock to be dewaxed is conducted from the storage tank 1, through line 2, to the top of the vertical cooling tower 3, divided into a plurality of stages 4, each provided with an agitator 12 and baffles 36 where it enters the first stage of the cooler 4a. The selected solvent is passed from storage tank 5 through line 6, through heat exchangers 7 and 8, where the solvent temperature is reduced to that sufficient to cool the oil to the desired temperature. Coolant enters the heat exchangers 7 and 8 through lines 32 and 34, respectively and leaves through lines 33 and 35. The solvent leaves the heat exchanger 8, through line 9, and enters manifold 10. The manifold comprises a series of parallel lines providing solvent inlets 11 to all stages of the cooling tower 3. The rate of flow through each inlet is regulated by either flow control or any other means (not shown). The rate of solvent flow is regulated so as to maintain a desired temperature gradient along the height of the cooling tower 3. The first portion or increment of the solvent enters the first stage, 4a, of the cooling tower 3 where it is substantially instantaneously admixed with oil due to the action of the agitator 12a, The agitator is driven by a variable speed motor 13 and the degree of agitation is controlled by variation of the motor speed, with due allowance for the flow rate through the cooling tower. The oil-solvent mixture may pass upwardly or downwardly through the cooling tower 3 (downward flow only has been shown). At various heights along the cooling tower, additional prechilled solvent is introduced to each of the several stages 4, through inlets 11 so as to maintain substantially the same temperature drop from each mixing stage to the next and at the same time to provide the desired degree of dilution. It should be noted that any number of stages up to 50 may be employed; however, at least six should be used. The oil-solvent solution with precipitated wax passes from the final stage of the cooling tower through line 14 to scraped surface cooler 15 where it is further cooled to precipitate additional wax. From chiller 15, the wax-oil mixture passes by lines 16 to filter 17 where the wax is separated from the oil at essentially the same temperature it leaves chiller 15, namely between −20° F. and +40° F. Solvent containing dissolved oil leaves the filter by line 18 to the shell side of solvent chiller 7 thence to dewaxed oil recovery. Wax is withdrawn from filter 17 by line 20 and is remixed with fresh solvent from line 21 and passed to second stage filter 22 where the wax is again separated at essentially the same temperature as filter 17. If desired the feed to the filters may be cooled about 5° F. below the filtering temperature to allow for possible warmup. The filter wax cake is washed with fresh solvent via line 21' to remove more oil from the slack wax cake. Recycle solvent containing a small amount of oil is withdrawn from filter 22 and a portion is passed by line 23 as wash for the wax cake on filter 17. The remainder is recycled to dilute the feed to filter 17 by line 24. Slack wax is withdrawn from filter 22 by line 25 and mixed with fresh solvent from line 26, at a temperature sufficient to warm the cake so as to dissolve the low-melting wax only, e.g., 40° F. However this temperature may be increased to as high as 80° F. as desired, depending upon the final grade of wax desired. Alternatively the slack wax can be withdrawn from filter 22 by line 25 and mixed with fresh solvent at a temperature lower than that required to reach the desired temperature. The resulting slack wax slurry can then be passed through a simple heat exchanger (not shown in the drawing) to obtain the desired temperature required to dissolve only the low-melting wax, e.g., 40° to 80° F. The mixture of solvent and undissolved high-boiling wax is passed by line 27 to filter 28 where the high-boiling wax is separated from the solvent. The wax cake on the filter is washed with fresh solvent introduced by line 29. Wax cake is removed and passed by line 30 to wax recovery. The dissolved low-melting wax and solvent are removed by line 31 and passed to solvent recovery.

The above description and attached drawing shows a process with two filtering stages and one deoiling stage. This is not necessarily the optimum operation which depends on the feedstock processed and availability of equipment in a particular plant. For low-viscosity feedstocks which are easy to process the dewaxing may be carried out in a single filtration stage and the deoiling also in a single filtration stage. With higher viscosity feedstocks, which are usually more difficult to process the following combinations could be used:

a. Two filter stages in dewaxing followed by one filter stage in deoiling b. Two filter stages in dewaxing followed by two filter stages in deoiling c. One filter stage in dewaxing followed by two filter stages in deoiling. Anybody versed in the art can see that each particular alternative offers advantages either for filter area or fresh solvent requirements with the associated refrigeration and recovery advantages.

Any petroleum oil stock or distillate fraction thereof may be dewaxed by the process of this invention. In general, these oil stocks or distillate fractions will have a boiling range within the broad range of about 500° to about 1,300° F. The preferred oil stocks are the lubricating oil and specialty oil fractions boiling within the range of 550° F. and 1,200° F. These fractions may come from any source, such as the paraffinic crudes obtained from Aramoc, Kuwait, the Panhandle, North Louisiana, Tia Juana, etc.

Any low-viscosity solvent for oil may be used in the process of this invention. Representative of such solvents are the ketones having three to six carbon atoms, such as acetone, methyl ethyl ketone (MEK), and methyl isobutyl ketone (MIBK), and the low-molecular weight hydrocarbons such as ethane, propane, propylene, and butane, as well as mixtures of the foregoing ketones and mixtures of the aforesaid ketones with aromatic compounds such as benzene and toluene, and mixtures of the aforesaid ketones with low-molecular weight hydrocarbons such as acetone propylene. In addition, the halogenated low-molecular weight hydrocarbons such as dichloromethane and dichloroethane and mixtures thereof may be used as solvents. Specific examples of suitable solvent mixtures are methyl ethyl ketone and methyl isobutyl ketone; methyl ethyl ketone and toluene and dichloromethane and dichloroethane. The preferred solvents are the ketones. A particularly preferred solvent mixture is a mixture of methyl ethyl ketone and methyl isobutyl ketone.

During the operation of the process of the present invention, the petroleum oil stock is fed to the cooling tower 3 at a temperature above its pour and cloud point. In the case of an oil fraction containing a relatively low amount of wax, the oil may be fed at ambient temperature. In the case of an oil containing a relatively large amount of wax an elevated temperature will be used. In general, the wax content of the oil feed will vary between 10 and 25 weight percent and the pour and cloud points will range between 70° and 170° F. and 75° and 175° F., respectively.

The solvent, or solvent mixture, will be prechilled to a temperature sufficient to permit cooling of the oil to the desired temperature. It will be apparent to those skilled in the art that the exact solvent temperature employed will depend upon the amount of oil to be cooled and the amount of solvent to be added to the oil; i.e., the degree of dilution which is sought during the filtration step and the desired tower outlet temperature. The prechilled solvent is added incrementally along the height of the cooling tower so as to maintain an overall average chilling rate below about 10° F./minute and preferably between 1° to about 5° F./minute. In general, the amount of solvent added will be sufficient to provide a liquid/solid weight ration between the range of 5/1 and 20/1 at the dewaxing temperature and a solvent/oil volume ratio between 1.5/1 and 5/1.

In general the degree of agitation must be sufficient to provide substantially instantaneous mixing, i.e., substantially complete mixing of the oil-solvent mixture in one second or less. In this way, the deleterious effects of shock chilling are offset; the chilling rate is more readily controlled and increased filtration rates are obtained.

PREFERRED EMBODIMENT

The invention will be more apparent from the preferred embodiment and working examples set forth below. Turning again to the drawing, a lubricating oil distillate fraction, having a boiling range from 700° to 890° F., a wax content of from about 18 to about 21 weight percent, and initial pour and cloud points between about 85° and 95° F. and 90° and 100° F., respectively, is fed from storage tank 1 through line 2 to the first stage 4a of the cooling tower 3 at a temperature of 100° to 110° F. A solvent such as a mixture of fifty weight percent methyl isobutyl ketone and 50 weight percent methyl ethyl ketone is passed from storage tank 5 through line 6 to the heat exchangers 7 and 8, where the solvent is cooled by conventional means to a temperature between −20 and −40° F. In the preferred embodiment cold filtrate from line 18 is used to precool the solvent in heat exchanger 7. The filtrate enters through line 32 and leaves through line 33. The solvent is further cooled in heat exchanger 8 with liquid propane or other suitable coolant, entering through line 34 and leaving through line 35. It is preferred that the solvent be prechilled to a temperature which will permit cooling of the oil to a temperature between about 20° F. and 25° F. although lower temperatures can be used. The chilled solvent passes from the heat exchanger 8 through line 9 to the manifold 10. In the preferred embodiment the cooling tower is divided into 16 stages, 4, and the manifold consists of 16 parallel solvent inlets 11, one for each mixing stage. Although not shown on the drawing, the solvent entering each stage inlet pipe 11 is preferably further subdivided and injected into the stage through a multiplicity of small, suitable placed jet nozzles as hereinbefore described. The solvent flow rate to each stage is controlled so as to give the desired temperature drop per stage, preferably merely by providing the proper number and size of jet nozzles for each stage. Each of the sixteen separate stages is provided with an agitator turbine 12 which is turned at a sufficiently high r.p.m. to produce adequate mixing of the stage contents. The solvent jet velocity will preferably be within the turbulent flow range, may vary from 50-100 ft./sec. or more and is held within the range of 5 to 30 times the peripheral velocity of the turbine blades. The oil and solvent entering the first stage 4a is substantially instantaneously mixed. As the oil-solvent mixture passes downwardly through the cooling tower, it is substantially instantaneously mixed with the contents of each subsequent stage and with the additional solvent which is added to each stage. As a result of the simultaneous, extremely rapid mixing of the warmer oil or oil solvent mixture from the preceding stage, and the cold solvent, with the contents of each stage the temperature of the total mixture in a given stage remains substantially constant. Thus, the temperature of the slurry drops in a series of sharp steps or shock chillings as it proceeds through the tower. Most surprisingly, this results in the formation of wax crystals of a very uniform size and very compact structure, having markedly superior filtering characteristics.

The oil-solvent mixture leaves the bottom of the cooling tower 3 as a slurry containing the wax crystals. If additional chilling is required, it is chilled by conventional scraped surface chiller 15 to about 0° F. and then passes to rotary filters 17 and 22, where it is filtered at 0° F. The wax from the second stage filter is mixed with fresh solvent from line 26 to form a mixture at 40° F. at which temperature the low-boiling wax dissolves leaving the high-boiling wax still suspended in the solvent. This high-boiling wax is separated by filter 28 at 40° F. and passed to wax recovery.

EXAMPLE 1

Results obtained by feeding a light lube distillate and a heavy lube distillate in the above described unit are shown below:

| Feed | Number stages | DWO yield | Wax yield On feed | Wax yield On slack wax | Wax M.P. (° F.) | Percent oil on wax |
|---|---|---|---|---|---|---|
| Light lube distillate (150 SUS at 100° F.) | 3 | 78.8 | 6.7 | 33 | 140 | <0.3 |
| Heavy lube distillate (1,400 SUS at 100° F.) | 3 | 74.6 | 8.5 | 37 | 180 | <0.3 |

These data show that wax having very low oil content can be prepared by the process of the present invention.

EXAMPLE 2

A 150N neutral distillate having a dry wax content of 19.8 wt. percent was dewaxed and recrystallized by conventional scraped surface chillers and also dewaxed and deoiled by the dilution chilling process of the present invention using a 50/50 mixture of methyl ethyl ketone and methyl isobutyl ketone as the solvent. The dewaxing temperature was 0° F. and the recrystallization of deoiling temperature was 80° F. The following data were obtained:

TABLE I.—REFINED CRYSTALLINE WAX PRODUCTION COMPARISON BY CONVENTIONAL RECRYSTALLIZATION AND INTEGRATED PROCESS USING DEOILING

| | Process | | |
|---|---|---|---|
| | Conventional dewaxing and recrystallization | Integrated dilution chilling | |
| | | Dewaxing | Deoiling |
| Source of data | Commercial plant | Laboratory pilot plant | |
| (1) Dewaxing Operation: | | | |
| Chilling type | Scraped surface | Dilution chilling | |
| Filtration stages | 3-consecutive | 2-countercurrent | Single |
| Temperature, ° F | 0 | 0 | 0 |
| Fresh solvent/feed ratio | 2.6 | 3.5:1[1] | 3.8:1 [2] |
| DWO yield on feed, weight percent | 74.2 | 78.8 | 76.5 |
| Weight percent oil in slack wax | 23.3 | 6.5 | 14.0 |
| Filter rate DWO, USG/hr-ft.[2] | 4.6 [2] | 9.3 [2] | 10.3 |
| Total filter area required for 100 bbl./feed/hr | 1,100 | 510 | 310 |
| (2) Wax production (recrystallization or deoiling): | | | |
| Chilling Type | Scraped surface | None | None |
| Filtration stages | 3-countercurrent | Single | Single |
| Fresh solvent added ratio to original waxy feed | 1.0:1 | 1.15:1 | 1.25:1 |
| Product yield on waxy feed, weight percent | 6.2 | 6.7 | 6.7 |
| Filter rate slack wax, USG/hr., ft.[2] | 4.3 [1] | 5.8 | 7.0 |
| Total filter area required for 100 bbl. slack wax/hr | 2,890 | 720 | 600 |
| (3) Total requirements for processing 100 bbl./hr. of waxy feed: | | | |
| Total fresh solvent-bbl | 360 | 465 (365) | 505 (385) |
| Total filter area, ft.[2] | 1,850 | 660 | 450 |
| Estimated scraped surface chiller area, ft.[2] | 7,140 | 2,000 | 2,000 |
| Recovery of useful product | 80.4 bbl | 85.5 | 83.2 |

[1] The fresh solvent to feed ratio was purposely maintained higher than in usual operation which is 2.6:1.
[2] Primary filter only.

The refined wax obtained by the two processes were analyzed by gas chromatography with the following results.

TABLE 2.—GAS CHROMATOGRAPHIC ANALYSES OF REFINED CRYSTALLINE WAXES

| Process | Commercial plant recrystallization | Integrated dilution chilling dewaxing and repuddling and deoiling | |
|---|---|---|---|
| Filtration States: | | | |
| Dewaxing | 3-consecutive | 2-countercurrent | [1] |
| Recrystallization | 3-countercurrent | No | No |
| Deoiling | | Single | Single |
| Slack wax oil content, weight percent | 23.3 | 6.5 | 14 |

Refined wax product, n-paraffin distribution:

| | | | |
|---|---|---|---|
| $C_{23}$ | 1.6 | 2.4 | 2.1 |
| $C_{24}$ | 3.5 | 4.1 | 3.6 |
| $C_{25}$ | 6.8 | 7.1 | 6.4 |
| $C_{26}$ | 10.0 | 10.1 | 9.4 |
| $C_{27}$ | 11.1 | 10.8 | 10.5 |
| $C_{28}$ | 11.2 | 10.6 | 10.5 |
| $C_{29}$ | 10.4 | 9.7 | 9.8 |
| $C_{30}$ | 7.8 | 7.3 | 7.5 |
| $C_{31}$ | 6.4 | 6.1 | 6.3 |
| $C_{32}$ | 3.8 | 3.8 | 4.0 |
| $C_{33}$ | 2.5 | 2.6 | 2.7 |
| $C_{34}$ | 1.2 | 1.3 | 1.4 |
| $C_{35}$ | 1.4 | 1.2 | 1.4 |
| Unresolved are [2] | 22.3 | 23.0 | 24.40 |
| Melting point | 140–142 | 140 | 140 |
| Oil content, weight percent | 0.3 | <0.3 | <0.3 |
| Needle penetration at 77° F | 12–13 | 11 | 11 |
| Stain temperature, ° F | >130 | 130 | >130 |
| Picking/blocking, [6] F | 102–111 | 103–112 | 103–112 |

[1] Single stage.
[2] Area due to the shift in the base line as percent of the total area indicates presence of non-normal paraffins but not the total percent shown.

The above data show that the process of the present invention eliminates expensive recrystallization of the wax, used 70 percent less filter area and scraped surface area than conventional processes. Eighty-four percent useful products are recovered compared to 80 percent by conventional processes with only a small increase in solvent requirements.

EXAMPLE 3

A Western Canadian 1400N distillate having a dry wax content of 23 percent was dewaxed and recrystallized by conventional scraped surface chillers and also dewaxed using a 30/70 mixture of methyl ethyl ketone and methyl isobutyl ketone as the solvent and deoiled by the process of the present invention. The following data were obtained.

TABLE 3.—REFINED CRYSTALLINE WAX PRODUCTION FOR COMPARISON BY CONVENTIONAL DEWAXING PLUS RECRYSTALLIZATION AND THE INTEGRATED PROCESS OF PRESENT INVENTION

| Process | Conventional dewaxing plus recrystallization | Integrated dilution chilling dewaxing-deoiling |
|---|---|---|
| (1) Dewaxing operation: | | |
| Chilling type | (1) | (2) |
| Filtration stages | 3 | 2 |
| Temperature, ° F | 25 | 25 |
| Fresh solvent/feed ratio | 5.1 | 4.5–5.5 |
| DWO yield on feed, weight percent | 68 | 74.6 |
| Weight percent oil in slack wax | 20–25 | 9.1 |
| Filter rate USG DWO/hr.-ft.[2] (primary) | 1.3 | 2.9 |
| Total filter area in ft.[2] for 100 is waxy feed/hr | 2,100 | 1,600 |
| (2) Wax production (recrystallization or deoiling): | | |
| Chilling type | (1) | None |
| Filtration stages | 3 | 1 |
| Temperature, ° F | 80 | 80 |
| Additional fresh solvent/waxy feed | 2.4 | 2.5 |
| Product yield on waxy feed, weight percent | 8.5 | 8.5 |
| Slack wax filter rate, USG/hr.-ft.[2] (primary) | 2.0 | 1.8 |
| Filter area in ft.[2] for 100 is slack/hr | 5,900 | 2,300 |
| (3) Total requirement for 100 is waxy feed/hr.: | | |
| Total fresh solvent-bbl | 750 | 700–800 |
| Total filter area-ft.[2] | 4,000 | 2,350 |
| Estimated scraped surface area in ft.[2] | 13,000 | 2,000 |
| Recovery of useful products, bbl | 76.5 | 83.1 |
| (4) Refined wax quality: | | |
| Oil content, weight percent | 0.8 | <0.3 |
| Melting point, ° F | 180–185 | 180 |
| Needle pen. at 77° F | 8–10 | 8 |

[1] Scraped surface.
[2] Dilution chilling.

The above data show that the process of the present invention eliminates expensive recrystallization and uses 40 percent less filter area and considerably less scraped surface area than the conventional process. At about equal fresh solvent requirement 83 percent useful product are recovered in comparison to 77 percent for conventional process.

We claim:

1. A combined dewaxing-deoiling process comprising introducing a waxy petroleum oil stock, where said oil stock is substantially free of recycled high-melting point wax, into a chilling zone divided into a plurality of stages, introducing a cold dewaxing solvent into said chilling zone at a plurality of spaced points along said chilling zone, maintaining a high degree of agitation in at least a portion of said stages so as to effect substantially instantaneous mixing of said solvent and said petroleum oil stock, cooling the solvent/waxy oil mixture as it progresses through the chilling zone thereby precipitating at least a portion of the wax from said petroleum oil stock, withdrawing a wax/oil/solvent mixture from said chilling zone, separating a slack wax containing low-melting and high-melting wax components from said wax/oil/solvent mixture, mixing said slack wax with solvent, heating the mixture to a temperature sufficient to dissolve only the low-melting wax components contained in said slack wax and recovering high-quality, high-melting wax from said slack wax-solvent mixture.

2. The method of claim 1 in which the solvent is a 50/50 or 30/70 mixture of methyl ethyl ketone and methyl isobutyl ketone.

3. The method of claim 1 in which the dewaxing temperature is 0° F. and the slack wax is mixed with fresh solvent and separated at 80° F.

4. The method of claim 1 in which the dewaxing temperature is 25° F. and the slack wax is mixed with fresh solvent and separated at 80° F.

5. A combined dewaxing-deoiling process comprising introducing a waxy petroleum oil stock, where said oil stock is substantially free of recycled high-melting point wax, into a chilling zone divided into at least six stages, introducing a cold dewaxing solvent into said chilling zone at a plurality of spaced points along said chilling zone, maintaining a high degree of agitation in at least a portion of said stages so as to effect substantially instantaneous mixing of said solvent and said oil, cooling the solvent/waxy oil mixture as it progresses through the chilling zone thereby precipitating at least a portion of said wax from said petroleum oil stock, withdrawing a wax/oil/solvent mixture from said chilling zone, separating a slack wax containing low-melting and high-melting wax components from said mixture, mixing said slack wax with solvent, heating the mixture to a temperature ranging from about 40° to 80° F. to dissolve substantially all of said low melting wax components, and recovering undissolved high-melting wax from said slack wax-solvent mixture.

6. The process of claim 1 wherein the wax/oil/solvent mixture is withdrawn from the chilling zone at a temperature between −20° and +40° F.

7. A combined dewaxing-deoiling process comprising introducing a waxy petroleum oil stock, where said oil stock is substantially free of high-melting wax, into a chilling zone divided into at least six stages, jetting a cold dewaxing solvent into said chilling zone at a plurality of spaced points along said chilling zone, maintaining a high degree of agitation in at least a portion of said stages so as to effect substantially instantaneous mixing of said solvent and said oil, cooling said mixture as it progresses through the chilling zone thereby precipitating wax from said petroleum oil stock, withdrawing a wax/oil/solvent mixture at a temperature between −20° and +40° F., separating a slack wax containing low-melting and high-melting wax components from said wax/oil/solvent mixture, mixing said slack wax with solvent, heating the mixture to a temperature sufficient to dissolve only the low-melting wax component contained in said slack wax, and recovering a high-quality, high-melting wax from said slack wax-solvent mixture.

8. A combined dewaxing-deoiling process comprising introducing a waxy petroleum oil stock, where said oil stock is substantially free of recycled high-melting wax, into a chilling zone divided into a plurality of stages, introducing a cold dewaxing solvent into said chilling zone at a plurality of spaced points along said chilling zone, substantially instantaneously mixing said solvent and said oil, in at least a portion of said stages, cooling the solvent/waxy oil mixture as it progresses through the chilling zone to precipitate at least a portion of the wax from said petroleum oil stock, withdrawing a wax/oil/solvent mixture from said chilling zone, separating a slack wax containing low-melting and high-melting wax components from said wax/oil/solvent mixture, mixing said slack wax with solvent, heating the mixture to a temperature sufficient to dissolve only the low-melting wax components contained in said slack wax, and recovering a high quality, high-melting wax from said slack wax/solvent mixture.

9. A combined dewaxing-deoiling process comprising introducing a waxy petroleum oil stock, where said oil stock is substantially free of recycled high-melting wax, into a chilling zone divided into a plurality of stages, introducing a cold dewaxing solvent into said chilling zone at a plurality of spaced points along said chilling zone, substantially instantaneously mixing said solvent and said oil, in at least a portion of said stages, cooling the solvent/waxy oil mixture as it progresses through the chilling zone to precipitate at least a portion of the wax from said petroleum oil stock, withdrawing a wax/oil/solvent mixture from said chilling zone, separating a slack wax containing low-melting and high-melting wax components from said wax/oil/solvent mixture, mixing said slack wax with solvent, heating the mixture to a temperature sufficient to dissolve substantially all of said low-melting wax components, and recovering undissolved high-melting wax from said slack wax/solvent mixture.

10. A combined dewaxing-deoiling process comprising introducing a waxy petroleum oil stock, where said oil stock is substantially free of high-melting wax, into a chilling zone divided into at least six stages, jetting a cold dewaxing solvent into each of said stages, maintaining a high degree of agitation in each of said stages so as to effect substantially instantaneous mixing of said solvent and said oil, cooling said mixture as it progresses through said chilling zone at a chilling rate below about 10° F. per minute, thereby precipitating at least a portion of the wax from said petroleum oil stock, withdrawing a wax/oil/solvent mixture at a temperature between −20° and +40 ° F., separating a slack wax containing low melting and high melting wax components from said wax/oil/solvent mixture, mixing said slack wax with solvent, heating the mixture to a temperature ranging from about 4° to 80° F. to dissolve substantially all of said low-melting wax components, and recovering undissolved high-melting wax from said slack wax/solvent mixture.

11. The process of claim 10 wherein said solvent is selected from the group consisting of ketones containing three to six carbon atoms and mixtures thereof.

12. The process of claim 11 wherein said solvent is a mixture comprising methylethyl ketone and methylisobutyl ketone.

13. The process of claim 5 wherein said solvent is a solvent mixture selected from the group consisting of (1) methylethyl ketone and toluene, (2) acetone and toluene, (3) acetone, benzene and toluene, (4) dichloroethane and dichloromethane, and (5) acetone and propylene.

14. The process of claim 1 wherein said solvent is selected from the group consisting of ketones containing three to six carbon atoms and mixtures thereof.

15. The process of claim 14 wherein said solvent is a mixture comprising methylethyl ketone and methylisobutyl ketone.

16. The process of claim 9 wherein said solvent is a solvent mixture selected from the group consisting of (1) methylethyl ketone and toluene, (2) acetone and toluene, (3) acetone, benzene and toluene, (4) dichloroethane and dichloromethane, and (5) acetone and propylene.

* * * * *

PO-1050
(5/69)

UNITED STATES PATENT OFFICE
CERTIFICATE OF CORRECTION

Patent No. 3,644,195      Dated February 22, 1972

Inventor(s) David A. Gudelis and John F. Eagen

It is certified that error appears in the above-identified patent and that said Letters Patent are hereby corrected as shown below:

Column 10, claim 10, line 15, "4°" should be deleted and --40°-- substituted therefor.

Line 15 should therefor read as follows:

"to a temperature ranging from about 40° to 80°F. to dissolve"

Signed and sealed this 10th day of July 1973.

(SEAL)
Attest:

EDWARD M. FLETCHER, JR.      Rene Tegtmeyer
Attesting Officer      Acting Commissioner of Patents